(12) United States Patent
Fischer

(10) Patent No.: US 11,776,777 B2
(45) Date of Patent: Oct. 3, 2023

(54) CHARGING PROTECTION AND REGULATION DEVICE FOR ELECTRON STORAGE

(71) Applicant: Taparity, LLC, Spokane, WA (US)

(72) Inventor: Steve Fischer, Windsor, CO (US)

(*) Notice: Subject to any disclaimer, the term of this patent is extended or adjusted under 35 U.S.C. 154(b) by 0 days.

(21) Appl. No.: 17/665,415

(22) Filed: Feb. 4, 2022

(65) Prior Publication Data

US 2022/0254585 A1    Aug. 11, 2022

Related U.S. Application Data

(60) Provisional application No. 63/146,363, filed on Feb. 5, 2021.

(51) Int. Cl.
*H02H 9/02* (2006.01)
*H01H 33/16* (2006.01)

(52) U.S. Cl.
CPC .......... *H01H 33/161* (2013.01); *H02H 9/026* (2013.01); *H01H 2033/163* (2013.01)

(58) Field of Classification Search
CPC . H01H 33/161; H01H 2033/163; H02H 9/026
See application file for complete search history.

(56) References Cited

U.S. PATENT DOCUMENTS

| | | | |
|---|---|---|---|
| 2010/0027276 A1* | 2/2010 | Kornitz | F21V 29/61 362/373 |
| 2012/0001611 A1 | 1/2012 | Sato | |
| 2012/0061070 A1* | 3/2012 | Kornitz | F21V 29/74 165/287 |
| 2012/0218674 A1 | 8/2012 | Schultz et al. | |
| 2014/0009064 A1* | 1/2014 | Kornitz | H05B 45/00 315/53 |
| 2014/0197735 A1 | 7/2014 | Komitz et al. | |
| 2017/0223804 A1* | 8/2017 | Battaglia | F21V 33/0092 |

FOREIGN PATENT DOCUMENTS

| | | | |
|---|---|---|---|
| CN | 105186477 A | 12/2015 | |
| WO | WO-2010012084 A1 * | 2/2010 | F21V 29/02 |

OTHER PUBLICATIONS

International Search Report and Written Opinion, dated May 12, 2022, for International Application No. PCT/US 22/15361, (8 pages).

* cited by examiner

*Primary Examiner* — Sisay G Tiku
(74) *Attorney, Agent, or Firm* — Seed IP Law Group LLP

(57) ABSTRACT

A charging protection and regulation device includes a matrix of Positive Temperature Coefficient (PTC) devices having multiple legs each including one or more PTC devices, a matrix of diodes having multiple legs and multiple types of diodes having different voltage drops, and a matrix of resistors having multiple legs each including a current limiting resistor. Each PTC device is thermally coupled to an ambient environment using a different amount of thermal coupling. Respective legs of the matrix of PTC devices, matrix of diodes, and matrix of resistors are electrically coupled together, and coupled to one or more electron storage devices. During conditions of overload or circuit fault, the PTC devices act as high resistance circuit interrupters. During conditions of light loading between input and output terminals, the different voltage drops across the diodes provide voltage regulation/current regulation such that a specified charge voltage is provided to electron storage devices.

17 Claims, 8 Drawing Sheets

CHARGING PROTECTION AND REGULATION DEVICE FOR ELECTRON STORAGE

BACKGROUND

Technical Field

The present disclosure relates generally to charging protection and regulation of electron storage devices, more particularly, to charging protection and regulation using materials having different positive temperature coefficients that are coupled to multiple types of diodes having different voltage drops.

Description of the Related Art

Conventionally, during charging of an electron storage device, charge and discharge currents can rise to unacceptable levels, which can destroy charging sources and can lead to component failures. In some cases, this can be hazardous to property and life.

Conventional practices involve regulation of power using switch mode regulators and/or series mode regulation to keep parameters within guide lines. Complexity and fail modes of such regulation can result in inoperative or dangerous conditions. Also, conventional current regulation techniques typically involve a common ground or return point, which provides a path for damage due to electrical over-voltage and other fault currents that circulate in current regulator and protection circuits.

BRIEF SUMMARY

Charging protection and regulation according to the present disclosure employs a PTC matrix, which has a plurality of legs each including one or more PTC devices thermally coupled to an ambient environment using different amounts of thermal coupling, a diode matrix, which includes a plurality of legs with multiple types of diodes having different voltage drops, and a resistor matrix, which includes a plurality of legs each with a current limiting resistor. Respective legs of the PTC matrix, diode matrix, and resistor matrix are electrically coupled together. During conditions of overload or circuit fault, the native function of PTC devices cause them to act as high resistance circuit interrupters. During conditions of light loading between input and output terminals, PTC devices effectively disappear, and voltage drops across diodes are used as a fixed regulator with a calculated resulting charge voltage to an electron storage system.

An apparatus according to the present disclosure may be characterized as including an input terminal, at least one output terminal, a plurality of temperature dependent devices electrically coupled to each other and to the input terminal, a plurality of first diodes electrically coupled to the temperature dependent devices, and a plurality of first resistors electrically coupled between the first diodes and the at least one output terminal. Each of the temperature dependent devices includes a material having a positive temperature coefficient, and each of the temperature dependent devices has a different amount of thermal coupling to an ambient environment. The first diodes includes at least first type of diode and a second type of diode, and a voltage drop across the first type of diode is different from a voltage drop across the second type of diode. The first type of diode can include a different type of diode than the second type of diode, and a voltage drop across the first type of diode is different from a voltage drop across the second type of diode.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings:

FIG. 5 is a diagram showing a display with examples operational characteristics of a charging protection and regulation device in accordance with embodiments described herein.

DETAILED DESCRIPTION

According to the embodiments of the present disclosure, electron storage devices can be charged without creating charging currents having unacceptably high levels that result in component failures or hazards to life and property. The present disclosure teaches novel methods of interrupting electron flow to and from storage devices such that safe operational parameters can be achieved. Charging protection and regulation devices according to the present disclosure use fewer components compared to conventional charging protection and regulation devices while providing redundancy of certain components. Thus, charging protection and regulation devices according to the present disclosure can be produced at reduced costs compared to conventional charging protection and regulation devices. In addition, charging protection and regulation devices according to the present disclosure have improved Mean Time Between Failures (MTBF) compared to conventional charging protection and regulation devices.

According to the present disclosure, Positive Temperature Coefficient (PTC) semiconductor-type materials are utilized to control and limit current in power supply and charging circuits of many types. Also, thermal conduction modulation techniques are used to achieve nonlinear heat transfer in charge management systems. For example, both physical proximity and total area of a heatsink can be used to thermally manipulate a temperature vs. resistance curve of a PTC material for desired current and voltage response. The use of one or more phase change materials can also be employed to modulate or maintain a specific temperature target based on characteristics of a selected phase change material. An aggregate of multiple temperature vs. resistance curves using PTC materials and semiconductor junctions is utilized. By mixing and matching different doping levels materials and performance characteristics of the PTC, a significant improvement can be made to an otherwise limited range of current in the charging circuits.

Figure 1:
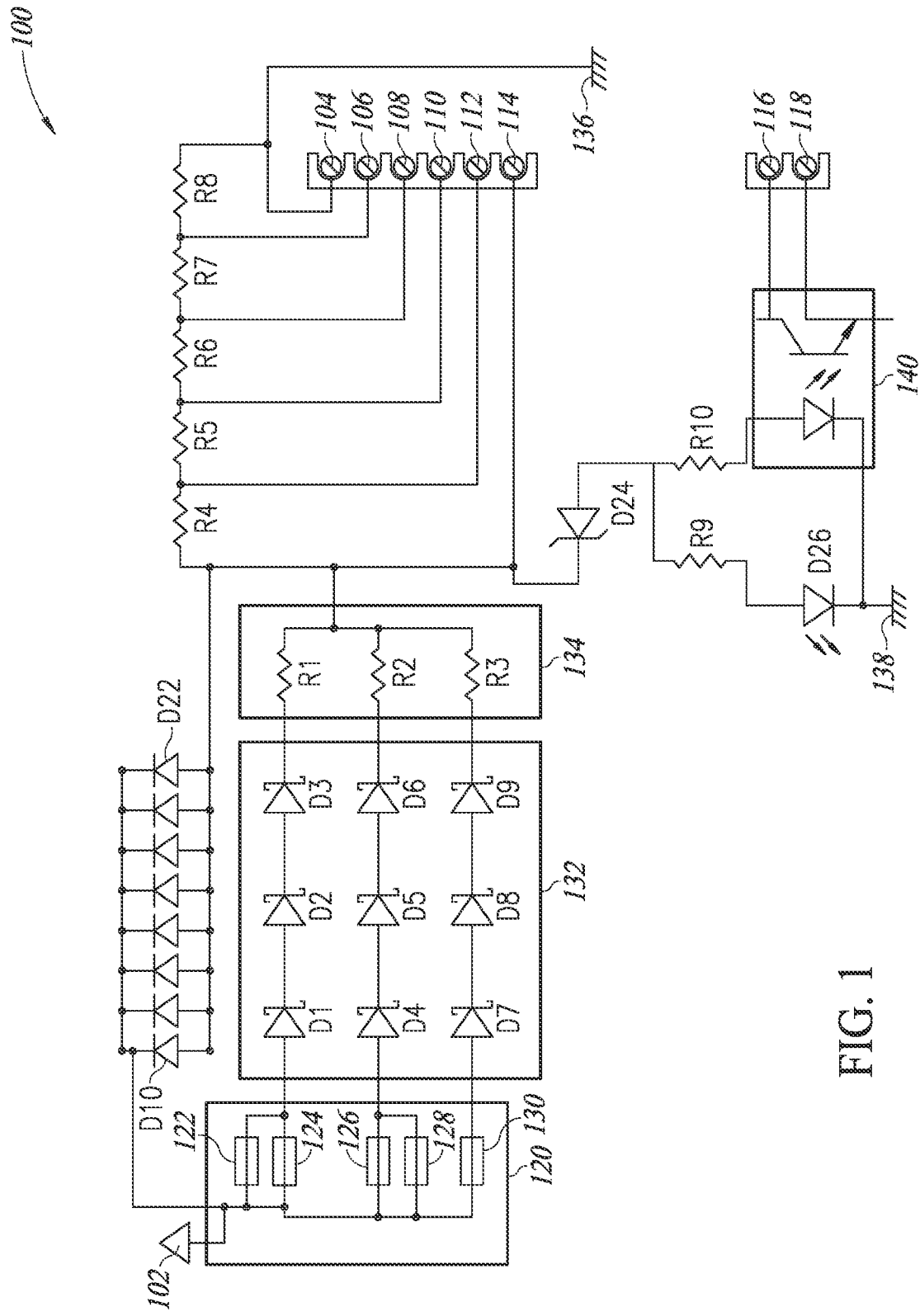
FIG. 1 is a circuit diagram of a charging protection and regulation device in accordance with embodiments described herein.

FIG. 1 is a circuit diagram of a charging protection and regulation device 100 in accordance with embodiments described herein. The charging protection and regulation device 100 includes 102 an input terminal 102 and a plurality of output terminals 104, 106, 108, 110, 112, 114, 116, 118.

The charging protection and regulation device 100 includes 102 also includes a PTC matrix 120, which includes a plurality of PTC devices 122, 124, 126, 128, 130 having a series/parallel configuration. Each of PTC devices 122, 124, 126, 128, 130 is thermally coupled to ambient temperatures through different amounts of heat sinking and or radiation (i.e., without heat sinking). For example, PTC devices 122, 124, 126, 128, 130 may be directly coupled (e.g., using a thermal adhesive) to different heat sinks each having a different total heatsink area. Some of PTC devices 122, 124, 126, 128, 130 may not be directly coupled to a heatsink, but placed in proximity to one or more heatsinks. PTC devices 122, 124, 126, 128, 130 may be coupled to the heatsinks using various material s/techniques.

Although the PTC matrix 120 shown in FIG. 1 includes five PTC devices, PTC matrices according to the present disclosure may include a different number of PTC devices without departing from the scope of the present disclosure. For example, PTC devices 122, 124, 126, 128, 130 are resettable fuses. In one or more implementations, PTC devices 122 and 128 are model XF075 resettable fuses available from Littelfuse, and PTC devices 124, 126, 128, 130 are model XF135 resettable fuses available from Littelfuse.

Each of PTC devices 122, 124, 126, 128, 130 has a first terminal and second terminal, wherein the first terminals of PTC devices 122, 124, 126, 128, 130 are electrically coupled (e.g., using wires and soldier) to the input terminal 102. In the implementation shown in FIG. 1, PTC devices 122 and 124 are electrically coupled in parallel, wherein the first terminals of each are electrically coupled together and the second terminals of each are electrically coupled together. Also, PTC devices 126 and 128 are electrically coupled in parallel, wherein the first terminals of each are electrically coupled together and the second terminals of each are electrically coupled together. The PTC matrix 120 shown in FIG. 1 includes three legs, wherein a first leg includes PTC devices 122 and 124, a second includes PTC devices 126 and 128, and a third leg includes PTC device 130.

Additionally, the charging protection and regulation device 100 includes a diode matrix 132, which includes a plurality of diodes D1, D2, D3, D4, D5, D6, D7, D8, D9. Although diode matrix 132 shown in FIG. 1 includes nine diodes, diode matrices according to the present disclosure may include a different number of diodes without departing from the scope of the present disclosure. Diode matrix 132 includes two multiple types of diodes, each having a different voltage drop when forward biased. For example, a first type of diode may have a voltage drop of 0.7 volts and a second type of diode may have a voltage drop of 0.35 volts. In one or more implementations, diodes D1, D2, D3, D4, D5, D7 are model 15SQ045 Schottky rectifier diodes available from Shunye Enterprise, and diodes D6, D8, D9 are model 10A10 standard silicon diodes available from Silicon Standard Corp. Other types of diodes may be used without departing from the scope of the present disclosure. For example, germanium diodes may be used.

The diode matrix 132 shown in FIG. 1 includes three legs that correspond to the three legs of the PTC matrix 120, wherein a first leg includes diodes D1, D2, and D3 electrically coupled in series, a second leg includes diodes D4, D5, and D6 electrically coupled in series, and a third leg includes diodes D7, D8, and D9 electrically coupled in series. More particularly, each of diodes D1, D2, D3, D4, D5, D6, D7, D8, D9 includes a first terminal (e.g., anode terminal) and a second terminal (e.g., cathode terminal). The first terminal of diode D1 is electrically coupled to the second terminals of PTC devices 122 and 124, and the second terminal of diode D1 is electrically coupled to the first terminal of diode D2, which has its second terminal electrically coupled to the first terminal of diode D3. The first terminal of diode D4 is electrically coupled to the second terminals of PTC devices 126 and 128, and the second terminal of diode D4 is electrically coupled to the first terminal of diode D5, which has its second terminal electrically coupled to the first terminal of diode D6. The first terminal of diode D7 is electrically coupled to the second terminal of PTC device 130, and the second terminal of diode D7 is electrically coupled to the first terminal of diode D8, which has its second terminal electrically coupled to the first terminal of diode D9.

Each leg of diode matrix 132 includes a different combination of diode types, which provide a wider band of voltage differentials between the input terminal 102 and the output terminals 104, 106, 108, 110, 112, 114 to allow further modulation of the PTC materials included in PTC devices 122, 124, 126, 128, 130.

During conditions of overload or circuit fault, the native function of PTC devices 122, 124, 126, 128, 130 is invoked and they act as high resistance circuit interrupters. This also accommodates a traditional "jump starting" with external power sources in case of depletion of power in a storage device. Without this ability, unacceptable amounts of current would flow into the storage device and not into a starter unit on an engine, or related electrical load. During conditions of light loading between the input terminal 102 and the output terminals 104, 106, 108, 110, 112, 114, PTC devices 122, 124, 126, 128, 130 effectively disappear, and the voltage drops across diodes D1, D2, D3, D4, D5, D6, D7, D8, D9 of the diode matrix 132 are used as a fixed regulator with a calculated resulting charge voltage to the electron storage system 200.

Additionally, the charging protection and regulation device 100 includes a resistor matrix 134, which includes a plurality of resistors R1, R2, R3. Although resistor matrix 134 shown in FIG. 1 includes three resistors, resistor matrices according to the present disclosure may include a different number of resistors without departing from the scope of the present disclosure. In one or more implementations, each of resistors R1, R2, R3 is a 10 Watt resistor having a resistance of 0.47 Ohm.

The resistor matrix 134 shown in FIG. 1 includes three legs that correspond to the three legs of diode matrix 132, wherein a first leg includes resistor R1, a second leg includes resistor R2, and a third leg includes resistor R2. Each of resistors R1, R2, R3 includes a first terminal and a second terminal. The first terminal of resistor R1 is electrically coupled to the second terminal of diode D3, the first terminal of resistor R2 is electrically coupled to the second terminal of diode D6, and the first terminal of resistor R3 is electrically coupled to the second terminal of diode D9. The second terminals of resistors R1, R2, R3 are electrically coupled together.

Also, the charging protection and regulation device 100 includes an array of diodes including diodes D10 to D22. The diodes D10 to D22 are specified by the amount of current needed for starting a load on demand, for example, starting an engine, or driving a DC motor to close or open a valve. In addition this allows for a system voltage to be higher than a storage voltage, and allows the PTC devices 122, 124, 126, 128, 130 and diodes D1, D2, D3, D4, D5, D6, D7, D8, D9 to determine the storage voltage not a bus voltage. Although the array of diodes shown in FIG. 1 includes eight diodes, arrays of diodes according to the present disclosure may include a different number of diodes without departing from the scope of the present disclosure. In one or more implementations, diodes D10 to D22 are the same type of diode as diodes D1, D2, D3, D4, D5, are D7. Diodes D10 to D22 are electrically coupled in parallel. More particularly, first terminals of diodes D10 to D22 are electrically coupled together, and second terminals of diodes D10 to D22 are electrically coupled. In addition, the first terminals of diodes D10 to D22 are electrically coupled to the input terminal 102, and the second terminals of diodes D10 to D22 are electrically coupled to the second terminals of resistors R1, R2, R3 and to the output terminal 114.

In addition, the charging protection and regulation device 100 includes an array of resistors including resistors R4, R5, R6, R7, and R8 that are electrically coupled in series. More particularly, the first terminal of resistor R4 is electrically coupled to the second terminals of resistors R1, R2, R3, to the output terminal 114, and to the first terminals of diodes D10 to D22. The second terminal of resistor R4 is electrically coupled to the first terminal of resistor R5 and to the output terminal 112. The second terminal of resistor R5 is electrically coupled to the first terminal of resistor R6 and to the output terminal 110. The second terminal of resistor R6 is electrically coupled to the first terminal of resistor R7 and to the output terminal 108. The second terminal of resistor R7 is electrically coupled to the first terminal of resistor R8 and to the output terminal 106. The second terminal of resistor R8 is electrically coupled to the output terminal 104 and to a ground terminal 136, which is electrically coupled to a reference potential. In one or more implementations, resistors R4, R5, R6, R7, and R8 each have a resistance of 390 Ohms. Although the array of resistors shown in FIG. 1 includes five resistors, arrays of resistors according to the present disclosure may include a different number of resistors without departing from the scope of the present disclosure. The number of resistors included in the array of resistors depends on (e.g., is equal to) the number of electron storage devices that are coupled to the charging protection and regulation device 100. For example, the five resistors R4, R5, R6, R7, R8 included in the array of resistors shown in FIG. 1 respectively correspond to five electron storage devices ESD1, ESD2, ESD3, ESD4, ESD5 shown in FIG. 2.

In addition, the charging protection and regulation device 100 includes circuity that outputs a visible indicator and an electronic indicator (e.g., alarm) when electron storage devices ESD1, ESD2, ESD3, ESD4, ESD5 are sufficiently charged. For example, the visible indicator and the electronic indicator may indicate that electron storage devices ESD1, ESD2, ESD3, ESD4, ESD5 are charged above a predetermined voltage that is required to start an engine of an automobile. More particularly, the circuity includes a diode D24 having a first terminal that is electrically coupled to first terminals of resistors R9 and R10, and a second terminal that is electrically coupled to the second terminals of resistors R1, R2, R3, and the output terminal 114. For example, diode D24 is a model 1N4738 Zener Diode from Digitron Semiconductors. A second terminal of resistor R9 is electrically coupled to a first terminal of a light emitting diode D26, which has a second terminal that is electrically coupled to a ground terminal 138 that is electrically coupled to the reference potential.

A second terminal of resistor R10 is electrically coupled to a first terminal of an opto-isolator 140, which also has a second terminal that is electrically coupled to the output terminal 116 and a third terminal that is electrically coupled to the output terminal 118. The opto-isolator 140 is used because the reference potential used in the charging protection and regulation device 100 may be different from a reference potential used in a system (e.g., automobile electrical system) to which the output terminals 116 and 118 are electrically coupled.

Figure 2:
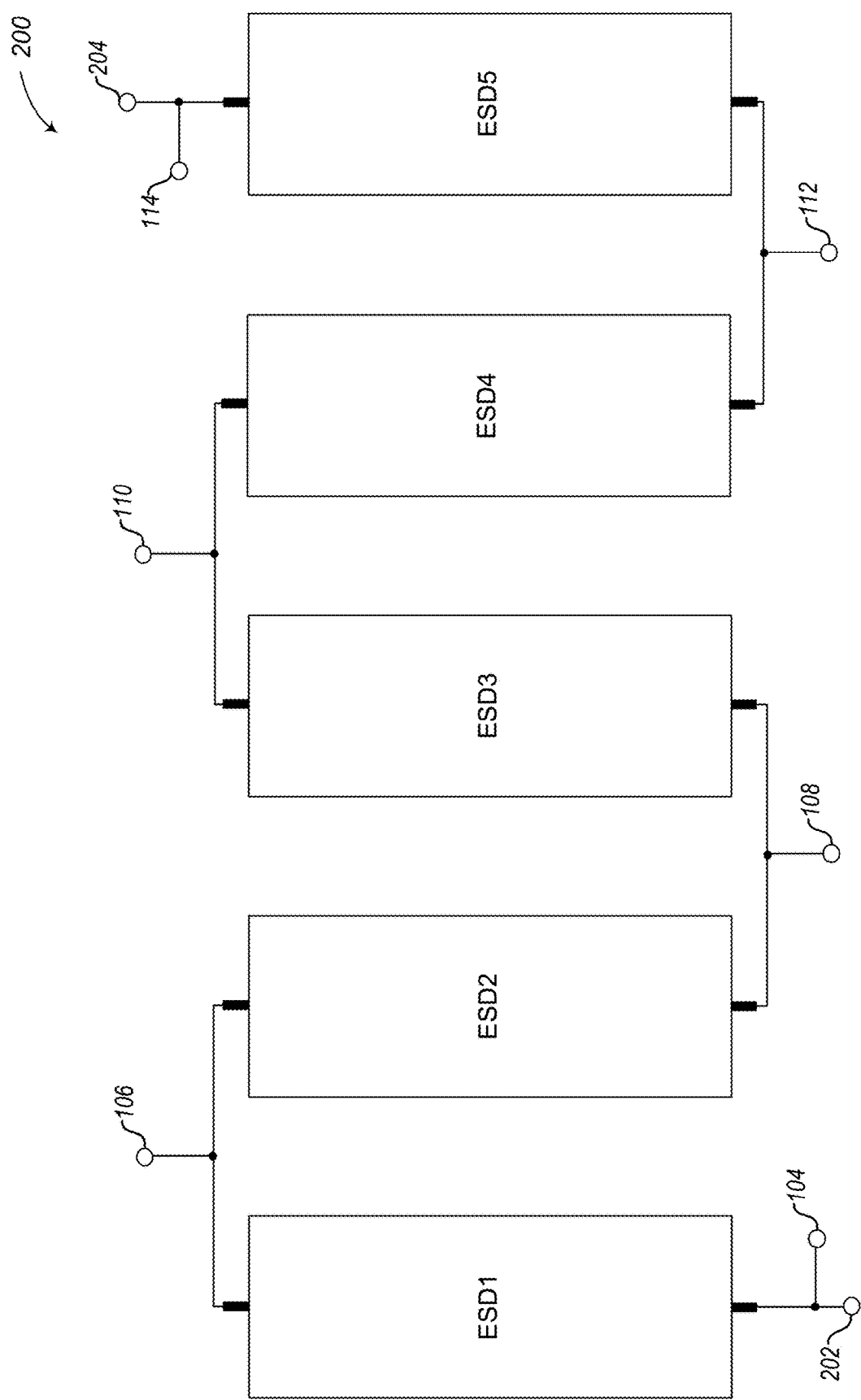
FIG. 2 is a circuit diagram of an electron storage system in accordance with embodiments described herein.

FIG. 2 is a circuit diagram of an electron storage system 200 in accordance with embodiments described herein. The electron storage system 200 includes a low-potential terminal 202 and a high-potential terminal 204. For example, the charging protection and regulation device 100 may include the electron storage system 200, and may replace a battery in an automobile, generator, or other internal combustion engine driven equipment, wherein the low-potential terminal 202 corresponds to the negative terminal of the battery and the high-potential terminal 204 corresponds to the positive terminal of the battery. The electron storage system 200 also includes electron storage devices ESD1, ESD2, ESD3, ESD4, ESD5. Electron storage devices ESD1, ESD2, ESD3, ESD4, ESD5 may be battery cells or capacitors, for example. In one or more implementations, each of electron storage devices ESD1, ESD2, ESD3, ESD4, ESD5 may be a 2.7 Volt, 500 Farad Supercapacitor from Shaluoman.

The electron storage devices ESD1, ESD2, ESD3, ESD4, and ESE5 are electrically coupled in series. More particularly, each of electron storage devices ESD1, ESD2, ESD3, ESD4, ESD5 includes a first terminal and a second terminal. The first terminal of electron storage device ESD1 is electrically coupled to the output terminal 104 of the charging protection and regulation device 100 and to the low-potential terminal 202 of the electron storage system 200. The second terminal of electron storage device ESD1 is electrically coupled to the output terminal 106 of the charging protection and regulation device 100 and to the first terminal of electron storage device ESD1. The second terminal of electron storage device ESD2 is electrically coupled to the output terminal 108 of the charging protection and regulation device 100 and to the first terminal of electron storage device ESD3. The second terminal of electron storage device ESD3 is electrically coupled to the output terminal 110 of the charging protection and regulation device and to the first terminal of electron storage device ESD4. The second terminal of electron storage device ESD4 is electrically coupled to the output terminal 112 of the charging protection and regulation device 100 and to the first terminal of electron storage device ESD5. The second terminal of electron storage device ESD5 is electrically coupled to output terminal 114 of the charging protection and regulation device 100 and to the high-potential terminal 204 of the electron storage system 200.

Figure 3A:
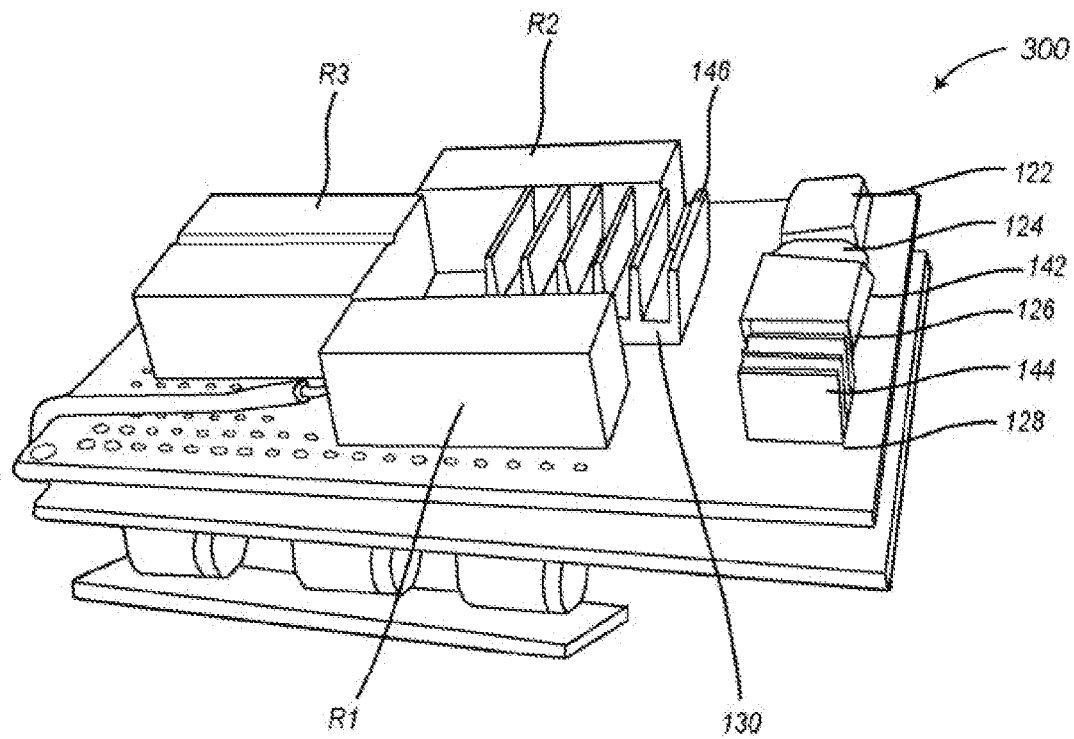
FIG. 3A is a diagram showing an example implantation of a charging protection and regulation device in accordance with embodiments described herein.
Figure 3B:
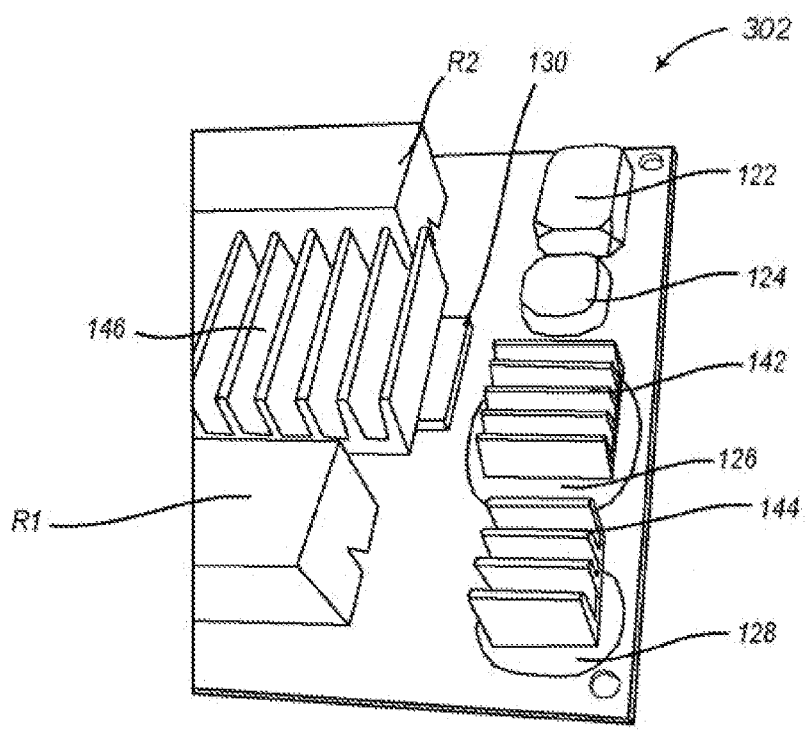
FIG. 3B shows an enlarged portion of the diagram shown in FIG. 3A.

FIG. 3A is a diagram showing an example implantation 300 of a charging protection and regulation device 100 in accordance with embodiments described herein, and FIG. 3B shows an enlarged portion 302 of the example implantation 300 shown in FIG. 3A. FIGS. 3A and 3B show an example of modulating resistance vs. temperature curves of PTC materials included in PTC devices 122, 124, 126, 128, 130 by varying amounts of thermal conductivity according to series resistance, which results in safely regulating steady state current, maximum current, and voltage.

As shown in FIG. 3A, the five PTC devices 122, 124, 126, 128, 130, and the three resistors R1, R2, R3 are mounted on a circuit board, along with heat sinks 142, 144, 146. Each of heat sinks 142, 144, 146 may be a passive heat exchanger that transfers the heat generated by one or more of PTC devices 122, 124, 126, 128, 130, and three resistors R1, R2, R3 to air in an ambient environment. For example, each of heat sinks 142, 144, 146 includes a plurality of fins that increase the effective surface area of the heat sink, which increases the ability of the heat sink to transfer heat to the air in the ambient environment.

More particularly, each of PTC devices 122, 124, 126, 128, 130 is thermally coupled to ambient temperatures through different amounts of heat sinking and or radiation. Different amounts of heat sinking and or radiation may be achieved by selecting heat sinks 142, 144, 146 such that each includes a different total heatsink area, as well as specific coupling of the heatsinks to PTC devices 122, 124, 126, 128, 130 with various materials and/or techniques. By providing different amounts of heatsinking and using novel combinations of diode types in each leg of diode matrix 132, a wide band of voltage differentials is provide between the input terminal 102 and the output terminals 104, 106, 108, 110, 112, 114, which allows further modulation of the PTC materials included in PTC devices 122, 124, 126, 128, 130. By careful selection of both materials included in PTC devices 122, 124, 126, 128, 130 it is possible to thermally modulate current management (amps) in a charging scenario. The three resistors R1, R2, and R2 of resistor matrix 134 provide overcurrent protection, and also increase the useable bandwidth of the resistance vs. temperature curve of the PTC materials included in each of PTC devices 122, 124, 126, 128, 130.

For example, as shown in FIGS. 3A and 3B, a heat sink is not thermally coupled to PTC devices 122 and 124. Heat sink 142 is thermally coupled to PTC device 126 using a thermal adhesive. Heat sink 144 is thermally coupled to PTC device 128 using a thermal adhesive. Heat sink 146 is thermally coupled to PTC device 130 using a thermal adhesive. A size of heat sink 146 is larger than a size of heat sink 142, which is larger than a size of heat sink 144. Also, PTC device 124 is closer to heat sinks 142 and 146 than PTC device 122. Accordingly, a different amount of thermal coupling to the ambient environment is provided for each of PTC devices 122, 124, 126, 128, 130.

Figure 4:
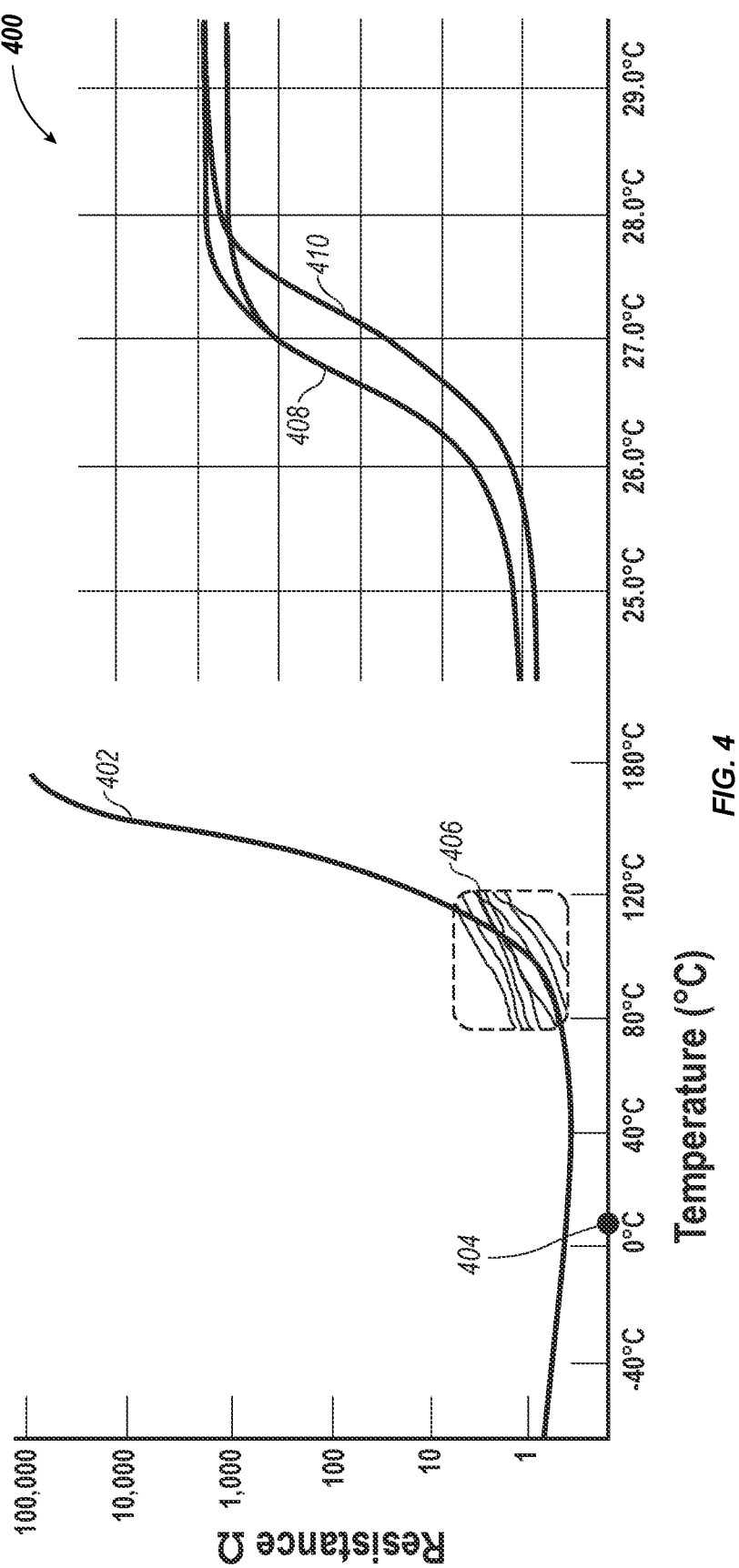
FIG. 4 is a diagram for explaining thermal current regulation in accordance with embodiments described herein.

FIG. 4 is a diagram for explaining thermal current regulation in accordance with embodiments described herein. The diagram includes a graph 400 of resistance vs. temperature, which includes a curve 402 corresponding to a typical PTC material included PTC devices 122, 124, 126, 128, 130. A marker 404 indicates room temperature. A box 406 includes a plurality of modulated resistance vs. temperature curves that can be obtained by using varying amounts of thermal coupling for different PTC devices and by using PTC devices including PTC materials having varying doping/voltage shifts. By staggering this area of curve 402 with multi channels of varying doping/voltage shifts and PTC make up, added power can be sent to an electron storage device. The charge window may be expanded even more by providing PTC contact with phase change media. For example, wax may be used as a phase change media that contacts one or more of PTC devices 122, 124, 126, 128, and 130, which changes states around by approximately 27 degrees Celsius. In addition, the graph 400 includes typical curves 408 and 410 of phase change energy used/spent to heat or cool, wherein the curve 408 is for a PTC device that is thermally coupled to a heat sink, and the curve 410 is for a PTC device that is not thermally coupled to a heat sink.

Figure 5:
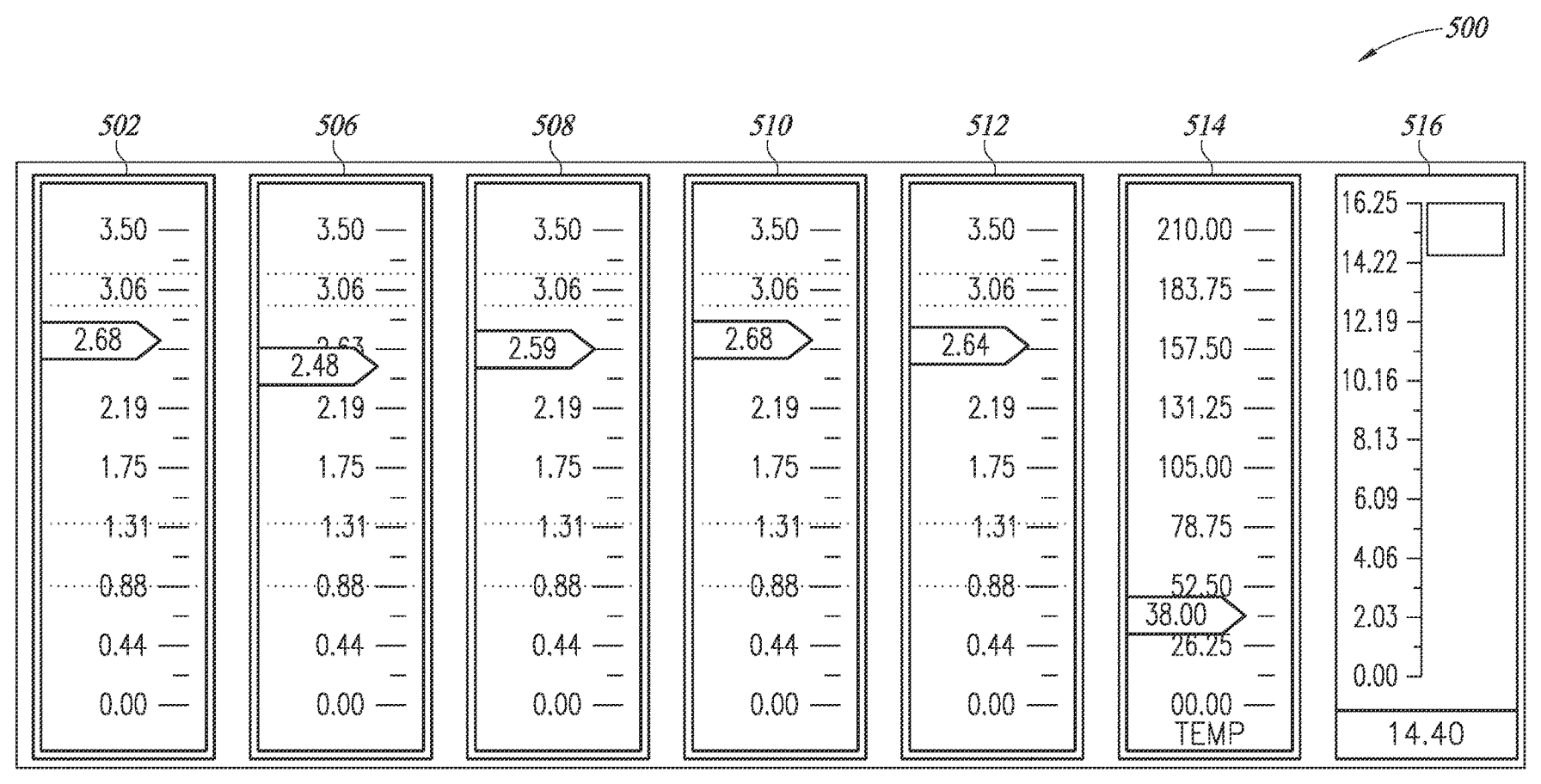

FIG. 5 is a diagram showing a display 500 with examples operational characteristics of a charging protection and regulation device in accordance with embodiments described herein. The display 500 includes graphic displays 504, 506, 508, 510, 512, 514, 516. Graphic display 504 indicates that a voltage between the first and second terminals of electron storage device ESD1 is voltage 2.68 volts. Graphic display 506 indicates that a voltage between the first and second terminals of electron storage device ESD2 is voltage 2.48 volts. Graphic display 508 indicates that a voltage between the first and second terminals of electron storage device ESD3 is voltage 2.59 volts. Graphic display 510 indicates that a voltage between the first and second terminals of electron storage device ESD4 is voltage 2.68 volts. Graphic display 512 indicates that a voltage between the first and second terminals of electron storage device ESD5 is voltage 2.64 volts. Graphic display 514 indicates that a temperature of the array of diodes D10 to D22 is 38 degrees Celsius. Graphic display 516 indicates that a voltage provided to the input terminal is 14.4 volts, which may correspond to the charging voltage output by an alternator in an automobile, for example. The values show in FIG. 5 were obtained shortly after the voltage was applied to the input terminal 102. As the charging protection and regulation device 100 operates for a longer period of time, the legs of the PTC matrix 120, diode matrix 132, and resistor matrix 134 that are coupled to respective ones of the output terminals 104, 106, 108, 110, 112, 114 would cause the voltages of electron storage devices ESD1, ESD2, ESD3, ESD4, ESD5 to become balanced wherein each has a voltage of 2.7 volts.

Figure 6:
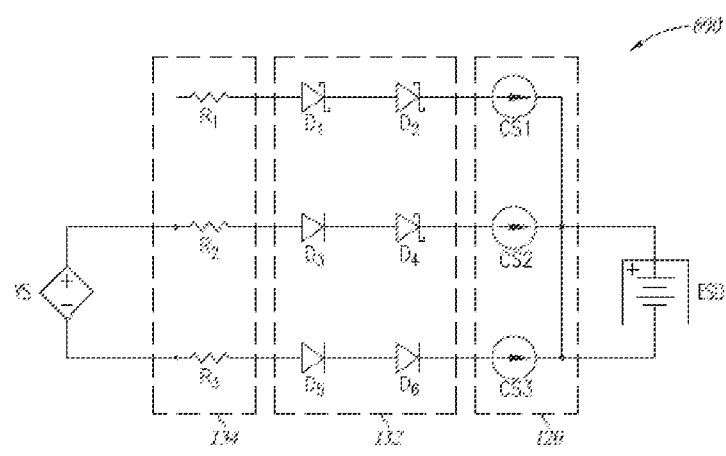
FIG. 6 is a diagram showing an equivalent circuit of a charging protection and regulation device in accordance with embodiments described herein.

FIG. 6 is a diagram showing an equivalent circuit 600 of a charging protection and regulation device in accordance with embodiments described herein. The equivalent circuit 600 corresponds to a charging protection and regulation device in which the PTC matrix 120, diode matrix 132, and resistor matrix 134 each have three legs, and which is coupled to a voltage source VS and an electron storage device ESD. By using different combinations of types of diodes D1, D2, D3, D4, D5, and D6, each leg of diode matrix 132 has includes a different combination of voltage drops. For example, a voltage across each of diodes D1 and D2 in a first leg of diode matrix 132 is 400 millivolts, respective voltages across diodes D3 and D4 in a second leg of diode matrix 132 are 600 millivolts and 400 millivolts, and a voltage across each of diodes D5 and D6 in a first leg of diode matrix 132 is 600 millivolts.

Figure 7A:
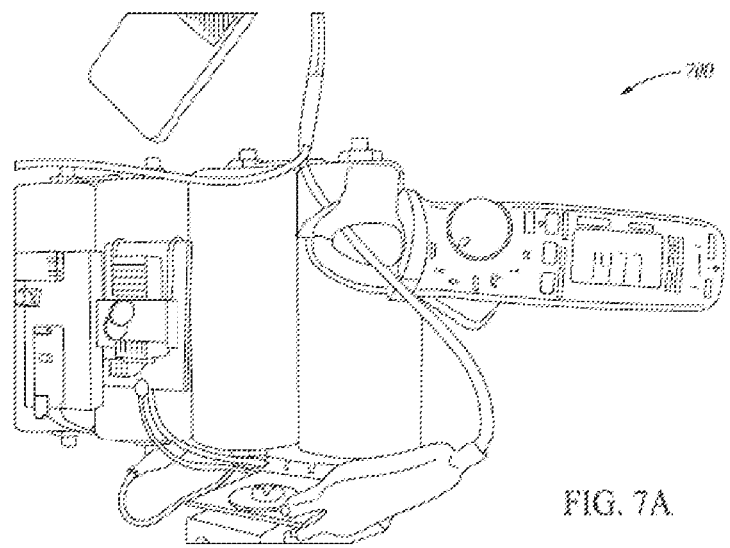
FIGS. 7A and 7B are diagrams showing different views of an example implantation of a charging protection and regulation device in accordance with embodiments described herein.
Figure 7B:
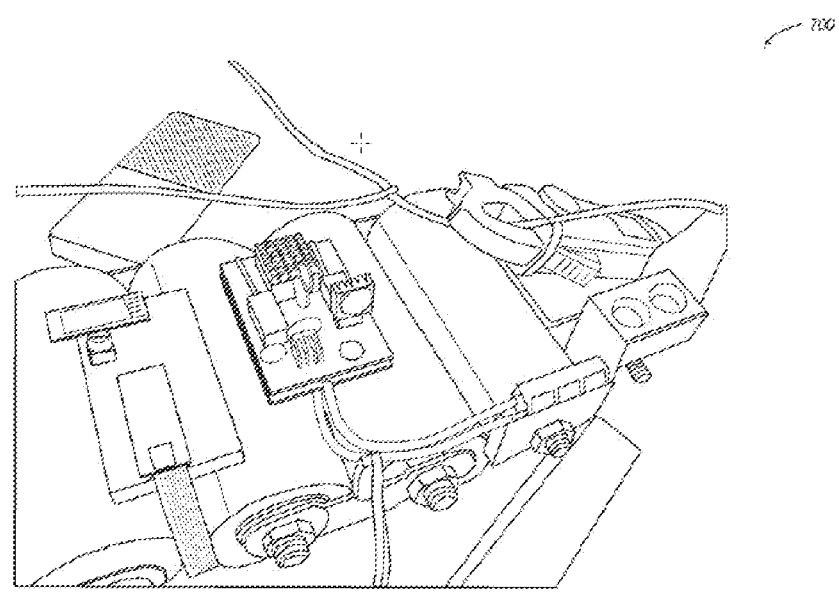

FIGS. 7A and 7B are diagrams showing different views of an example implantation of a charging protection and regulation device 700 in accordance with embodiments described herein. For example, FIG. 7A shows that, while an electrical event corresponding to a first end of jumper cables being attached to respective terminals of a car battery, a second send of the jumper cables being attached to the input terminal 102 and the output terminal 104, respectively, a maximum current of 1.477 amps is provided to an electron storage device, which would not damage electron storage device.

The various embodiments described above can be combined to provide further embodiments. All of the U.S.

patents, U.S. patent application publications, U.S. patent applications, foreign patents, foreign patent applications and non-patent publications referred to in this specification and/or listed in the Application Data Sheet are incorporated herein by reference, in their entirety.

Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus comprising:
an input terminal;
at least one output terminal;
a plurality of temperature dependent devices electrically coupled to each other and to the input terminal, wherein each of the temperature dependent devices includes a material having a positive temperature coefficient, and wherein each of the temperature dependent devices has a different amount of thermal coupling to an ambient environment;
a plurality of first diodes electrically coupled to the temperature dependent devices, wherein the first diodes include at least a first type of diode and a second type of diode, and wherein a voltage drop across the first type of diode is different from a voltage drop across the second type of diode; and
a plurality of first resistors electrically coupled between the first diodes and the at least one output terminal,
wherein:
each of the temperature dependent devices includes a first terminal and a second terminal,
each of the first diodes includes a first terminal and a second terminal,
each of the first resistors includes a first terminal and a second terminal,
the first terminal of each of the temperature dependent devices is electrically coupled to the input terminal,
the second terminal of each of the temperature dependent devices is electrically coupled to the first terminal of one of the first diodes, and
the first terminal of each of the first resistors is electrically coupled to the second terminal of one of the first diodes, and
the second terminal of each of the first resistors is electrically coupled to the at least one output terminal.

2. The apparatus according to claim 1, wherein the second terminal of each of the first resistors is electrically coupled together.

3. The apparatus according to claim 1, wherein each of the first resistors has a same electrical resistance.

4. The apparatus according to claim 1, wherein:
the second terminal of a first one of the temperature dependent devices is electrically coupled to the second terminal of a second one of the temperature dependent devices.

5. The apparatus according to claim 4, wherein:
the second terminal of a third one of the temperature dependent devices is electrically coupled to the second terminal of a fourth one of the temperature dependent devices.

6. The apparatus according to claim 5, wherein:
the second terminal of the first one of the temperature dependent devices and the second terminal of the second one of the temperature dependent devices are electrically coupled to the first terminal of a first one of the first diodes,
the second terminal of the first one of the first diodes is electrically coupled to the first terminal of a second one of the first diodes,
the second terminal of the second one of the first diodes is electrically coupled to the first terminal of a third one of the first diodes,
the second terminal of the third one of the first diodes is electrically coupled to the first terminal of a first one of the first resistors,
the second terminal of the third one of the temperature dependent devices and the second terminal of the fourth one of the temperature dependent devices are electrically coupled to the first terminal of a fourth one of the first diodes,
the second terminal of the fourth one of the first diodes is electrically coupled to the first terminal of a fifth one of the first diodes,
the second terminal of the fifth one of the first diodes is electrically coupled to the first terminal of a sixth one of the first diodes,
the second terminal of the sixth one of the first diodes is electrically coupled to the first terminal of a second one of the first resistors,
the second terminal of a fifth one of the temperature dependent devices is electrically coupled to the first terminal of a seventh one of the first diodes,
the second terminal of the seventh one of the first diodes is electrically coupled to the first terminal of an eighth one of the first diodes,
the second terminal of the eighth one of the first diodes is electrically coupled to the first terminal of a ninth one of the first diodes,
the second terminal of the ninth one of the first diodes is electrically coupled to the first terminal of a third one of the first resistors.

7. An apparatus comprising:
an input terminal;
at least one output terminal;
a plurality of temperature dependent devices electrically coupled to each other and to the input terminal, wherein each of the temperature dependent devices includes a material having a positive temperature coefficient, and wherein each of the temperature dependent devices has a different amount of thermal coupling to an ambient environment;
a plurality of first diodes electrically coupled to the temperature dependent devices, wherein the first diodes include at least a first type of diode and a second type of diode, and wherein a voltage drop across the first type of diode is different from a voltage drop across the second type of diode;
a plurality of first resistors electrically coupled between the first diodes and the at least one output terminal; and
at least one electron storage device electrically coupled to the at least one output terminal, wherein:
the at least one electron storage device includes a plurality of electron storage devices,
the at least one output terminal includes a plurality of output terminals,
each of electron storage devices includes a first terminal and a second terminal,
a first one of the output terminals is electrically coupled to the first terminal of a first one of electron storage devices,
a second one of the output terminals is electrically coupled to the second terminal of the first one of electron storage device and the first terminal of a second one of electron storage devices, and
a third one of the output terminals is electrically coupled to the second terminal of the second one of electron storage devices.

8. The apparatus according to claim 7, wherein:
the second terminal of the second one of electron storage devices is electrically coupled to the first terminal of a third one of electron storage devices, and
a fourth one of the output terminals is electrically coupled to the second terminal of the third one of electron storage devices.

9. The apparatus according to claim 8, wherein:
the second terminal of the third one of electron storage devices is electrically coupled to the first terminal of a fourth one of electron storage devices, and
a fifth one of the output terminals is electrically coupled to the second terminal of the fourth one of electron storage devices.

10. The apparatus according to claim 9, wherein:
the second terminal of the fourth one of electron storage devices is electrically coupled to the first terminal of a fifth one of electron storage devices, and
a sixth one of the output terminals is electrically coupled to the second terminal of the fifth one of electron storage devices.

11. An apparatus comprising:
an input terminal;
at least one output terminal;
a plurality of temperature dependent devices electrically coupled to each other and to the input terminal, wherein each of the temperature dependent devices includes a material having a positive temperature coefficient, and wherein each of the temperature dependent devices has a different amount of thermal coupling to an ambient environment;
a plurality of first diodes electrically coupled to the temperature dependent devices, wherein the first diodes include at least a first type of diode and a second type of diode, and wherein a voltage drop across the first type of diode is different from a voltage drop across the second type of diode;
a plurality of first resistors electrically coupled between the first diodes and the at least one output terminal;
a plurality of second resistors electrically coupled between the first resistors and the at least one output terminal; and
a plurality of second diodes,
wherein:
each of the second diodes includes a first terminal and a second terminal;
the first terminal of each of the second diodes is electrically coupled together and to the at least one output terminal, and
the second terminal of each of the second diodes is electrically coupled together and to the input terminal.

12. The apparatus according to claim 11, wherein each of the second resistors has a same electrical resistance.

13. An apparatus comprising:
an input terminal;
at least one output terminal;
a plurality of temperature dependent devices electrically coupled to each other and to the input terminal, wherein each of the temperature dependent devices includes a material having a positive temperature coefficient, and wherein each of the temperature dependent devices has a different amount of thermal coupling to an ambient environment;
a plurality of first diodes electrically coupled to the temperature dependent devices, wherein the first diodes include at least a first type of diode and a second type of diode, and wherein a voltage drop across the first type of diode is different from a voltage drop across the second type of diode;
a plurality of first resistors electrically coupled between the first diodes and the at least one output terminal; and
a plurality of second resistors electrically coupled between the first resistors and the at least one output terminal,
wherein:
each of the second resistors includes a first terminal and a second terminal,
the at least one output terminal includes a plurality of output terminals,
a first one of the output terminals is electrically coupled to the second terminal of each of the first resistors and the first terminal of a first one of the second resistors,
a second one of the output terminals is electrically coupled to the second terminal of the first one of the second resistors and the first terminal of a second one of the second resistors, and
a third one of the output terminals is electrically coupled to the second terminal of the second one of the second resistors and the first terminal of a third one of the second resistors.

14. The apparatus according to claim 13, wherein:
a fourth one of the output terminals is electrically coupled to the second terminal of the third one of the second resistors and the first terminal of a fourth one of the second resistors.

15. The apparatus according to claim 14, wherein:
a fifth one of the output terminals is electrically coupled to the second terminal of the fourth one of the second resistors and the first terminal of a fifth one of the second resistors.

16. The apparatus according to claim 15, wherein the second terminal of the fifth one of the second resistors is electrically coupled a ground terminal.

17. An apparatus comprising:
an input terminal;
at least one output terminal;
a plurality of temperature dependent devices electrically coupled to each other and to the input terminal, wherein each of the temperature dependent devices includes a material having a positive temperature coefficient, and wherein each of the temperature dependent devices has a different amount of thermal coupling to an ambient environment;

a plurality of first diodes electrically coupled to the temperature dependent devices, wherein the first diodes include at least a first type of diode and a second type of diode, and wherein a voltage drop across the first type of diode is different from a voltage drop across the second type of diode;

a plurality of first resistors electrically coupled between the first diodes and the at least one output terminal; and a plurality of second diodes, wherein:

each of the second diodes includes a first terminal and a second terminal;

the first terminal of each of the second diodes is electrically coupled together and to the second terminal of each of the first resistors and to the at least one output terminal, and the second terminal of each of the second diodes is electrically coupled together and to the input terminal.

* * * * *